XR 3,919,527

United States Patent [19] TX 3030D

Bowen et al.

[11] B 3,919,527

[45] Nov. 11, 1975

[54] OMNIDIRECTIONAL OPTICAL SCANNER

[75] Inventors: Arlen J. Bowen; LeRoy D. Dickson; Jerome A. Goretzki; Kenneth E. Hendrickson; Donald P. King; Terrance W. Kueper; Ronald L. Soderstrom, all of Rochester, Minn.

[73] Assignee: International Business Machines Corporation, Armonk, N.Y.

[22] Filed: July 26, 1973

[21] Appl. No.: 382,783

[44] Published under the Trial Voluntary Protest Program on January 28, 1975 as document no. B 382,783.

[52] U.S. Cl. .......................... 235/61.11 E; 250/566

[51] Int. Cl.[2] ...................... G06K 7/10; G08C 9/06

[58] Field of Search ............ 235/61, 11 E; 250/555, 250/566

[56] References Cited

UNITED STATES PATENTS

| | | | |
|---|---|---|---|
| 3,677,465 | 7/1972 | Johnson et al. | 235/61.11 E |
| 3,684,867 | 8/1972 | Acker | 235/61.11 E |
| 3,701,098 | 10/1972 | Acker | 235/61.11 E |

*Primary Examiner*—Daryl W. Cook
*Attorney, Agent, or Firm*—Donald F. Voss

[57] ABSTRACT

An omnidirectional optical scanner scans bar coded labels passed relative to a rectangular scan window with a plurality of interlaced X's whereby the labels are completely scanned irrespective of their orientation.

The interlaced X's are generated from a laser light source directed onto a first oscillating mirror for deflecting the light beam in a horizontal direction at a slow frequency. A second oscillating mirror is positioned to further deflect the light beam in a vertical direction at a higher frequency. The horizontal and vertical frequencies are set at a particular ratio so that the X's overlap and the scan on the return passes midway between the legs of a previous scan. The horizontal and vertical amplitudes are controlled by horizontal and vertical photo detectors located adjacent the scan window which provide inputs to amplitude control circuits to assure an orthogonal pattern by keeping the crossing angle constant. The oscillating mirrors are phase and frequency locked by a precision digital system to assure phase lock stability and thereby prevent voids in the scan pattern.

The scan window crops out the end portions of the scan pattern. Generally, the most linear parts of the scan pattern, but including the turn around portions of the scans within the scan window are used. However, in one embodiment, end mirrors fold the end portions of the scan pattern outside of the window into the scan window toward the center thereof to enhance the scanning of certain labels.

8 Claims, 9 Drawing Figures

3919527
OR IN 235/61.11E

OMNIDIRECTIONAL OPTICAL SCANNER

BACKGROUND OF THE INVENTION

1. Field of the Invention

This invention relates to optical scanning systems and more particularly to omnidirectional optical scanning systems.

The invention finds particular application for scanning randomly oriented bar coded labels, which for example, are attached to consumer items being checked out at a counter. The check out operator merely passes the item across the scan window insuring that the label is within the scan window as the item is being placed into a box or bag. Except for certain small items, little attention need be paid to the orientation of the items as they are moved across the scan window.

2. Description of the Prior Art

Omnidirectional scanning systems such as in U.S. Pat. Nos. 3,718,761 and 3,728,677 are not particularly suitable for scanning systems where the operator passes the items across the scan window because they require a square scan window rather than a narrow rectangular scan window. The square scan window for a given width requires a greater reach and is not as desirable from a human factors point of view as a narrow rectangular scan window. The narrow rectangular scan window; however, requires multiple X patterns to insure that the coded label will be properly scanned. The multiple X patterns are produced in this invention by sine wave light patterns and have a subtle safety advantage in that the average laser power entering a fixed aperture (laser power times aperture diameter divided by length of scan) is less. The sine wave light patterns on the other hand introduced linearity problems which this invention solved.

The use of two oscillating mirrors to produce sine wave light patterns is well known in the prior art as evidenced by U.S. Pat. Nos. 1,756,232; 1,951,666 and 3,437,393. However none of these patents teach phase control to produce an X pattern without degeneration which would result in scan voids. Also, in applicants' invention amplitude control is needed to maintain the crossing angle of the scans constant. These latter mentioned patents are not directed to omnidirectional scanners. The omnidirectional scanner of applicants' invention is useful for scanning bar coded labels which may pass anywhere in the scan window. Thus the X scan pattern should be uniform. Ideally, the scan lines should intersect at the longitudinal axis of the scan window and at 45° and 135°. In practice, with $f_V/f_H = A_H/A_V$ where f=frequency and A=amplitude the scan lines are at 45° and 135° to the longitudinal or horizontal axis at the center of the scan window but are at 55° and 125° at the edges. This error in applicants' invention is spread out or normalized by introducing a constant or stretch factor of 1.05 whereby: $A_H/A_V = 1.05\ f_v/f_H$. It should be recognized that other stretch or compression factors may be used to increase or decrease the intersection angles as may be advantageous in a particular application. The scan lines then intersect at 40° and 140° at the center and 50° and 130° at the edges so as to be centered about the ideal intersections of 45° and 135°.

In applicants' invention, the ratio of the low (horizontal) and high (vertical) frequencies is important so as to make the X's as linear in curvature as possible to reduce the unused portion of the scan and thereby reduce scan speed and to interlace the scans so the X's are at an optimum spacing for scanning a particular bar code label.

The turn around portions (nonlinear) of the Lissajous scan pattern may or may not be used in the scan window depending upon the type of label being scanned. It is desirable to have horizontal scans for scanning short or segmented labels. The turn around portions of the Lissajous pattern, although not linear, are useful for forming horizontal scans. This eliminates scan gaps which can occur in the scanning arrangements of U.S. Pat. Nos. 3,718,761 and 3,728,677. Further, in applicants' invention, by folding the end portions of the Lissajous pattern which are outside of the scan window into the scan window, substantially vertical scans are formed at the central portion of the scan window. These vertical scans are helpful for scanning worst case label conditions.

In applicants' invention, it is critical that the frequency and phase lock system be very accurate. The mirrors are oscillated at resonance and the Q is very high. Thus, any appreciable shift in frequency renders the system unstable. Applicants' preferred embodiment uses a digital frequency and phase lock system. Most prior art frequency and phase lock systems require a continuous frequency change until the desired phase lock is achieved. In such systems even a small frequency shift requires a long correction time because to achieve system stability the change in frequency must be slow. Applicants' arrangement permits a relatively large change in frequency because it is made instantaneously rather than being continuous. Further, stability is maintained by making the changes at a slow rate; i.e., a change in frequency is made only once during a predetermined sample period which occurs less frequently than the period of the oscillating mirror being controlled.

SUMMARY OF THE INVENTION

The principal objects of applicants' invention are to provide an improved omnidirecitonal scanning system which:

a. is capable of scanning bar coded labels without regard to label orientation, b. can be used with a narrow rectangular scan window, c. has high stability and accuracy, d. is highly reliable and e. is relatively inexpensive.

These objects are achieved by using an intense, substantially non-divergent light source such as a laser and deflecting the light beam with two oscillating mirrors, which are phase and frequency locked, to a narrow rectangular scan window which masks out the nonlinear end portions of the scan. The two mirrors are oscillated at frequencies which cause the beam to trace out a pattern of overlapping X's. Amplitude control is included to maintain the light beam at a constant crossing angle. The frequency and phase lock maintains uniform spacing of the X's and prevents the scan pattern from degenerating.

DESCRIPTION

Figure 1:
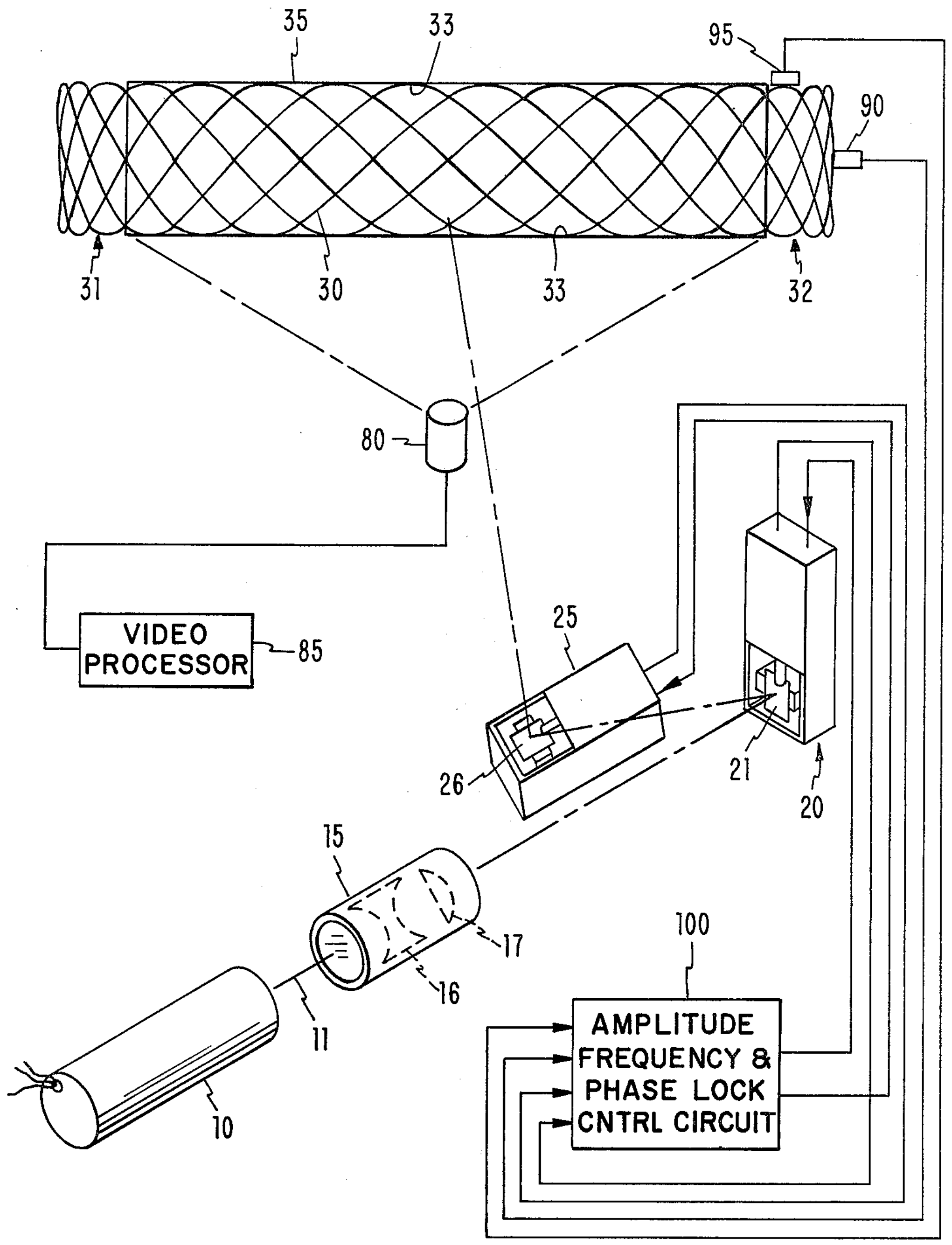
FIG. 1 is a perspective view illustrating the omnidirectional scanning system of the invention.

With reference to the drawings and particularly to FIG. 1, the invention is illustrated by way of example as including a laser light source 10 which provides an intense narrow beam of light schematically illustrated by line 11. This beam of light is directed onto a beam expander 15 which includes lens 16 for expanding the laser beam and focusing lens 17 for focusing the expanded beam and directing the beam onto mirror 21 of the horizontal torsional deflector 20.

The beam is reflected from mirror 21 to mirror 26 of vertical torsional deflector 25. The terms horizontal and vertical are arbitrary and could be interchanged without affecting the scope of the invention. However, one of the torsional deflectors, in this example, horizontal deflector 20 is operated at a lower frequency than the operation of vertical deflector 25. The horizontal deflector 20 and vertical deflector 25 are operated at resonance with a predetermined frequency ratio whereby the beam of light traces out a pattern of interlaced X's 30 in scan window 35.

The beam from laser 10 is expanded and then focused so as to obtain a small focused spot near the large focal length of the focusing lens 17. The maximum deflection angle of the torsional deflectors 20 and 25 dictates the focal length. However, the large focal length increases the depth of field.

Horizontal deflector 20 moves the beam so as to scan the length of window 35 and vertical deflector 25 causes the beam to scan the width of window 35. The combination of these orthogonal deflections at predetermined fixed frequency and amplitude ratios produces the pattern of interlaced X's at scan window 35.

Figure 9:
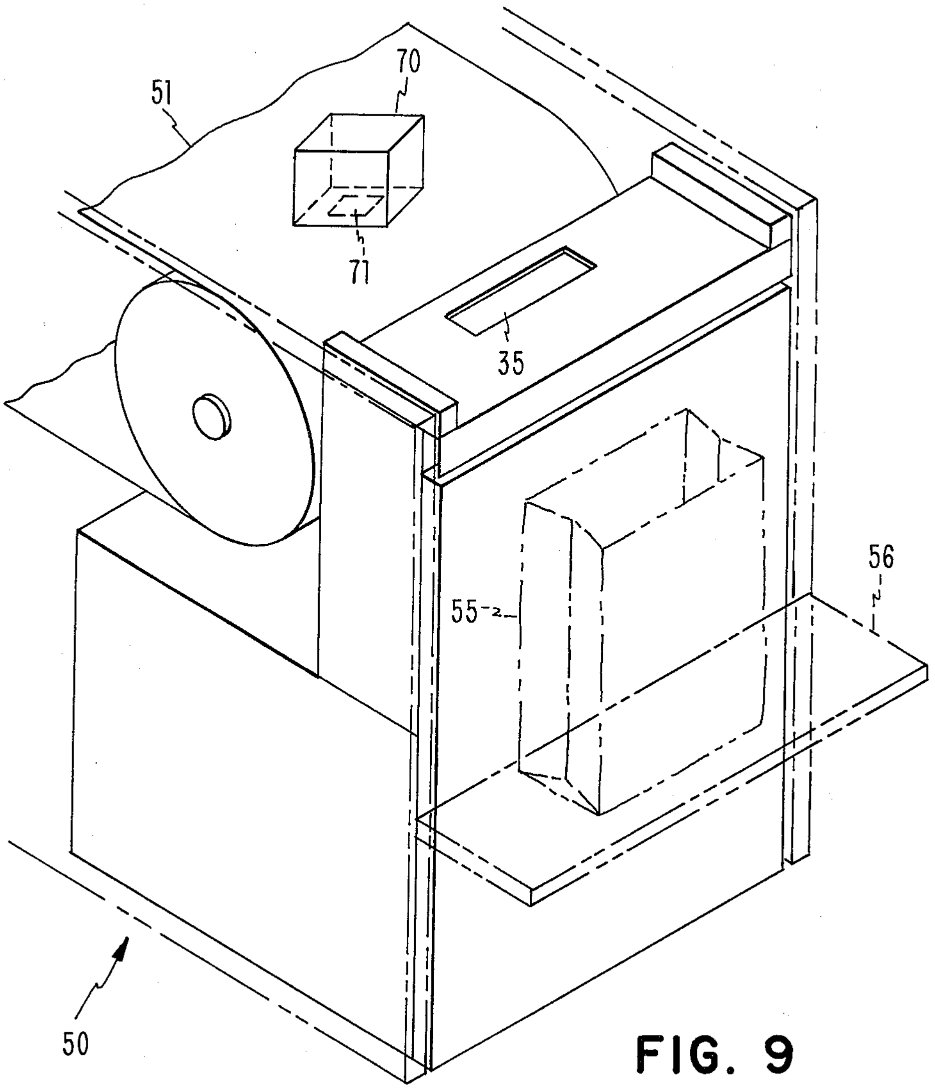
FIG. 9 is a perspective view illustrating the invention incorporated in a housing at a check out counter.

Scan window 35 is located at the top of an enclosure 50, FIG. 9, for housing the previously described elements. Scan window 35 is a narrow rectangular aperture formed in the housing and covered by glass or other suitable transparent material.

In FIG. 9 an article 70 bearing a bar coded label 71 is transported by conveyor belt 51 to the scanning area. The checkout operator passes the article 70 with label 71 face down over scan window 35 in preparation to place the article 70 into bag 55 which is supported on shelf 56.

Figure 8:
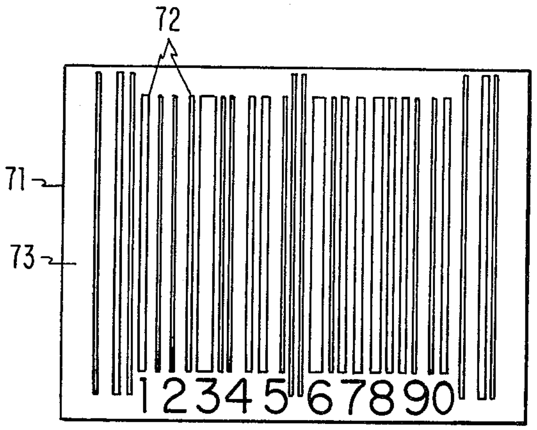
FIG. 8 is a diagram showing a typical label.

Label 71 is a bar coded label of the type shown in FIG. 8. Label 71 is printed with a plurality of bars 72 which have a reflectance less than the background area 73. Thus, as the beam scans across label 71, it is modulated by the reflectance difference between the background 73 and the printed ink bars 72. The modulated reflected light is collected by photo multiplier tube 80 in FIG. 1 which converts it to an electrical signal. This electrical signal is passed to video processor 85 which analyzes the electrical signal to identify the information represented by bar 72 on label 71.

The scan pattern 30 can read label 71 irrespective of its orientation. In the embodiment shown in FIG. 1, the end portions 31 and 32 of scan pattern 30 fall outside of or are cropped out by scan window 35. Photo detectors 90 and 95 are positioned within housing 50 near scan window 35 so as to detect the vertical and horizontal amplitudes of the beam as it traces out scan pattern 30. The signals from photo detectors 90 and 95 are fed to amplitude, frequency and phase lock control circuit 100.

In this example scan window 35 is approximately 7.27 inches by 1.3 inches. Deflectors 20 and 25 are operated at frequencies which result in an interlaced X pattern which will insure proper scanning of label 71. The X's must not be too far apart or closer than necessary to properly read the label 71. A ratio of 5 1/3 has been found to be satisfactory for a scan window of the aforementioned dimensions. In general, the scans should cross each other at the horizontal axis of the scan window and be substantially perpendicular to each other at the point of intersection. Horizontal and vertical amplitude control circuits keep this crossing angle constant and the frequency and phase lock circuit maintains a uniform space in between the X's and prevents the scan pattern from degenerating. Degeneration of the scan pattern would cause scan voids resulting in improper reading of the label 71.

Figure 2:
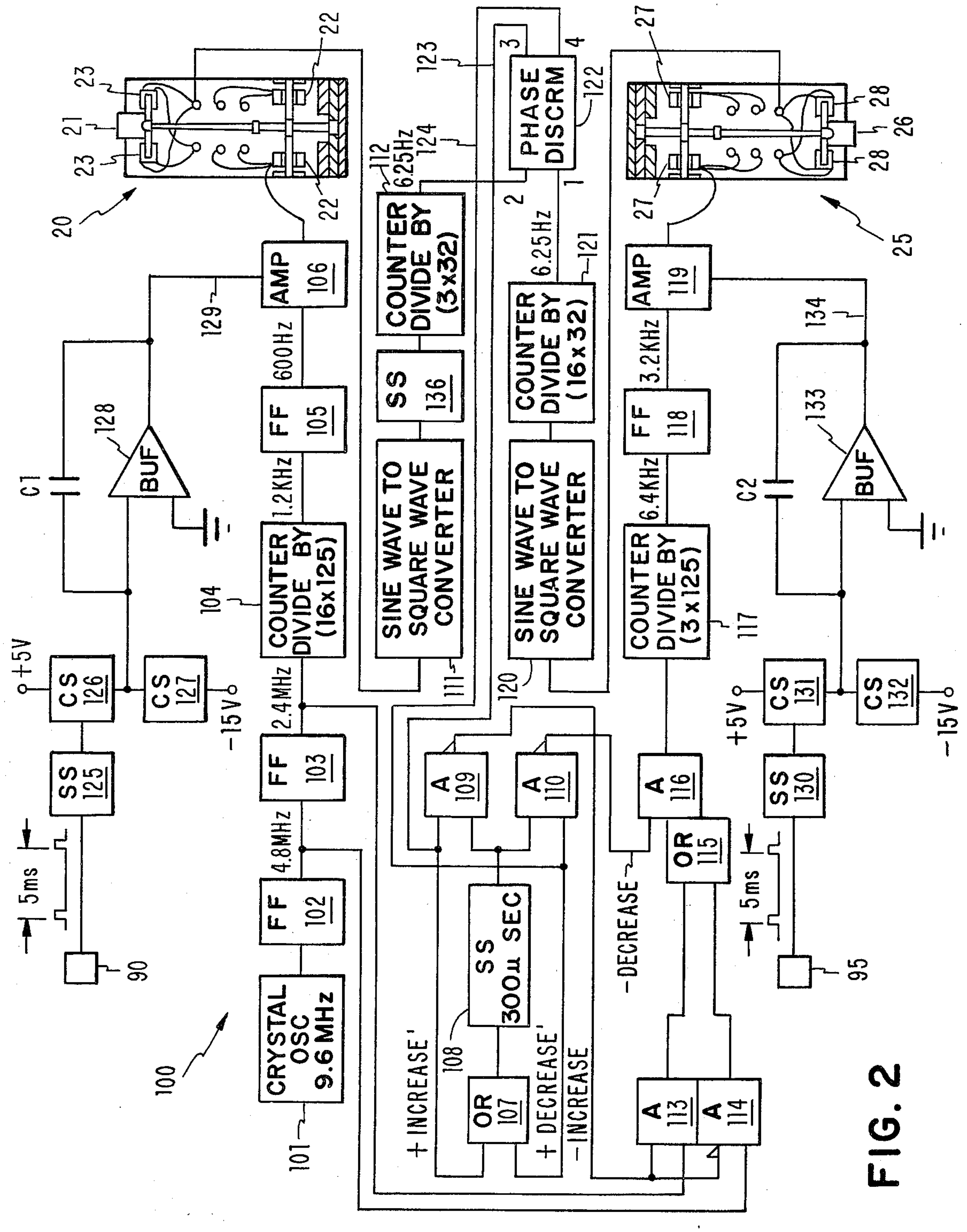
FIG. 2 is a schematic block circuit diagram of the control circuit showing a preferred embodiment of the frequency and phase lock system and including the amplitude control circuit.

The amplitude frequency and phase lock control circuit 100 of FIG. 1 is shown in detail in FIG. 2. The horizontal and vertical amplitude control circuits are substantially identical and control the horizontal and vertical amplitudes by controlling the amount of current passed by amplifiers 106 and 119 to deflectors 20 and 25 respectively. Amplifiers 106 and 119 are controlled by the amount of voltage on conductors 129 and 134 respectively. The voltages on these conductors depends upon the charges on capacitors C1 and C2 respectively. Current sources 126 and 131 are positive current sources and current sources 127 and 132 are negative current sources. The positive current sources 126 and 131 are turned on under control of single shot multivibrators 125 and 130 respectively. The single shot multivibrators in turn are fired by signals from the photodetectors 90 and 95 respectively. When either positive current source is turned on, its associated capacitor starts to charge whereby the voltage output from the associated buffer amplifier; i.e., amplifier 128 or 133, reduces. When the positive current source is turned off, the associated capacitor starts to discharge and this increases the voltage at the output of the associated buffer amplifier. This in turn increases the current for driving the associated torsional deflector.

Torsional deflectors 20 and 25 are driven from a system clock 101. The frequency of system clock 101 is dependent upon the desired phase lock accuracy because a correction is made only when the phase error exceeds one cycle of the system clock. The principles of the frequency and phase lock circuit in FIG. 2 can be understood with reference to FIG. 3 which shows a more general digital frequency and phase lock system.

Figure 3:
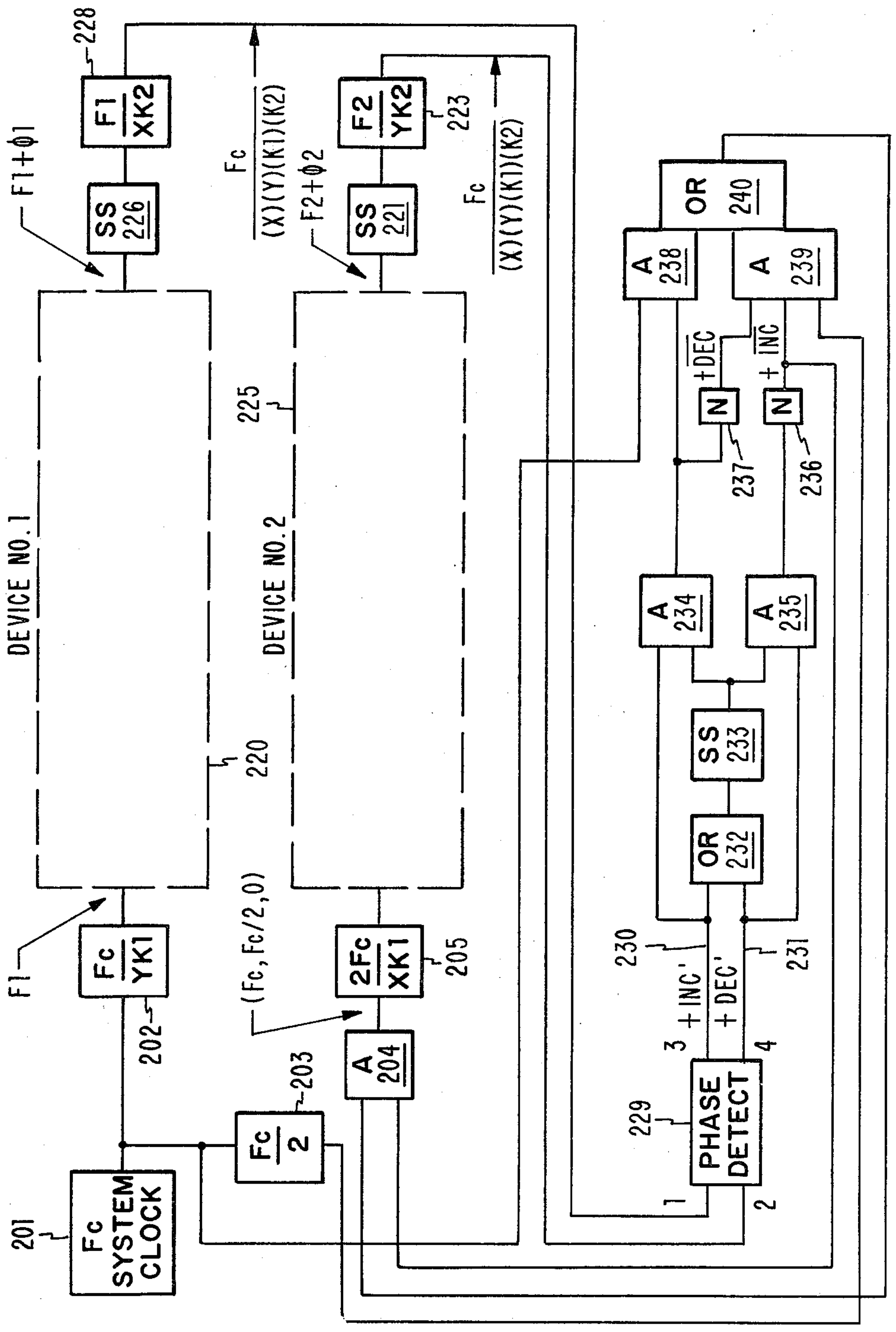
FIG. 3 is a more general schematic block circuit diagram of the frequency and phase lock system of FIG. 2.

In FIG. 3 system clock 201 has a frequency $Fc$. The frequency $Fc = (F2)\ (X)\ (K1) = (F1)\ (Y)\ (K1)$ where the frequency F2 is either the higher or the lower of the two frequencies. The selected ratio of the frequencies F1 to F2 determines the values of X and Y. The constant K1 is related to the system phase lock accuracy. In FIG. 3, $F1 = Fc/Y\ K1$. This is represented by a block 202. The frequency F1 drives device 220 which corresponds to torsional deflector 20 of FIGS. 1 and 2. Device 220 generates an output signal at a frequency F1 plus a phase shift $\phi\omega$. The phase shift is not constant for the device and varies from device to device.

Frequency F2 drives device 225 which corresponds to torsional deflector 25 of FIGS. 1 and 2. The frequency of device 225 is $F2 + \phi 2$ where $\phi 2$ is the phase shift from the input frequency F2. The frequencies can be locked in or out of phase depending upon the requirements of the scan pattern which in turn is dependent upon the ratio of the frequencies F1 and F2. In order to phase lock with a predetermined constant phase shift single shot multivibrators 221 and 226 can be connected into the circuit. Only one of the single shot multivibrators 221 and 226 would be connected into the circuit at any one time. In FIG. 2 as it will be seen shortly, the frequencies are phase locked with a predetermined constant phase shift.

The phase shifts are compared by phase detector 229. However, to facilitate a phase shift comparision, the two frequencies are normalized to a common frequency by blocks 223 and 228 respectively. The normalized frequency equals $Fc/(X)\ (Y)\ (K1)\ (K2)$. The constant K2 is an integer number that determines the error sampling rate of phase detector 229. By making the constant K2 large, the sample rate for the phase shift comparison is kept low.

If the output of block 223 lags the output of block 228, phase detector 229 provides a +INC signal on conductor 230 and if the output of block 223 leads the output of block 228 phase detector 229 provides a +DEC signal on conductor 231. If the outputs of blocks 223 and 228 are in phase, there is no output from phase detector 229. When the outputs of blocks 223 and 228 are in phase, no correction is made to the frequency F2 and block 205 is driven at a frequency of $Fc/2$ from block 203 via AND circuit 239 which is conditioned by +INC and +DEC signals from inverters 236 and 237 respectively. The output of AND circuit 239 feeds OR circuit 240 which in turn feeds AND circuit 204. AND circuit 204 is conditioned at this time by the output of inverter 237.

When phase detector 229 provides a +INC signal on conductor 230, AND circuit 234 is conditioned whereby the frequency F2 operates at twice its normal frequency. The amount of correction which can take place at any one sample time is limited by single shot multivibrator 233 which is fired by a signal from OR circuit 232 which receives +INC and +DEC signals from phase detector 229. The output of AND circuit 234 is applied to AND circuit 238 which also receives an input from system clock 201. The output of AND circuit 238 is applied to block 205 via OR circuit 240 and AND circuit 204. AND circuit 204 is conditioned at this time by the output of inverter 237. Whenever the frequency of F2 is to be decreased, it is reduced to zero by applying a +DEC signal to AND circuit 235. This causes the output of inverter 237 to decondition AND circuit 204. Thus block 205 is not driven by either either the system clock 201 or by block 203.

It is seen that the principles of the digital frequency and phase lock system are:

a. to use a relatively high frequency system clock to assure phase lock accuracy, frequency division circuit (flip flops and counters) enable the use of the high frequency clock;

b. to normalize the frequencies of the driven devices to a common low frequency to provide a low error sample rate;

c. to adjust the phase shifts with the high frequency system clock or with zero frequency; and d. to limit the amount of phase shift adjustment during any one correction period.

In FIG. 2 the horizontal frequency is selected to be 600 Hertz and the vertical frequency is 3.2 K Hertz. The constant K1 equals 1,000, X equals 16 and Y equals 3. The frequency of system clock 101 is 9.6 M Hertz. The horizontal frequency of 600 Hertz is derived by first dividing the system frequency of 9.6 M Hertz in half. This is done by flip-flop 102. The 4.8 M Hertz frequency is again divided in half by flip flop 103 and the resulting frequency of 2.4 M Hertz is divided by 16 × 125 or 2000. This division is accomplished by counter 104 to result in a frequency of 1.2 K Hertz. The frequency of 1.2 K Hertz is divided in half by flip-flop 105 to result in a frequency of 600 Hertz which is applied to amplifier 106. The output of amplifier 106 is applied to magnet coils 22 of torsional deflector 20. Coils 22 are connected in parallel and drive mirror 21 through an associated armature and drive rod. The torsional deflectors 20 and 25 are the type shown and described in U.S. Pat. No. 3,609,485 entitled "Resident Torsional Oscillators."

As mirror 21 is oscillated by the signal from amplifier 106, signals are generated by transducers 23 which are connected in series. Signals from transducers 23 are applied to a sine wave to a square wave converter 111. The signals from the sine wave to square wave converter 111 are applied to single shot multivibrator 136 for generating pulses having a width of 78.1 $\mu$ seconds and the frequency thereof is then normalized by counter 112 which divides the frequency effectively by 3 × 32. The output of counter 112 is applied to phase discriminator 122.

In a similar manner mirror 26 of torsional deflector 25 is oscillated in response to a signal from amplifier 119 which is applied to coils 27. Amplifier 119 receives a signal at a frequency of 3.2 K Hertz from flip flop 118. Flip flop 118 functions to divide the frequency from counter 117 in half. Counter 117 is driven by signals at the output of AND circuit 116. Counter 117 divides the frequency effectively by 3 × 125 or 375. This maintains the frequency ratio of 5 ⅓.

Counter 117 is normally advanced by signals at a frequency of 2.4 M Hertz from the output of flip flop 103 via AND circuit 113, OR circuit 115 and AND circuit 116. However, if the phase shifts as detected by phase discriminator 122 are not equal, counter 117 will be advanced at a frequency of 4.8 M Hertz by signals at the output of flip flop 102 or not advanced at all; i.e., at zero M Hertz depending upon whether the difference in phase shift is to be increased or decreased so as to make the phase shifts equal.

As mirror 26 is oscillated by the output of amplifier 119, transducers 28 which are connected in series generate signals. These signals are applied to sine wave to square wave converter 120 and its output is normalized by counter 121 which divides the output from converter 120 by 16 × 32. The output of counter 121 is applied to phase discriminator 122.

In this instance, the frequencies of the signals from transducers 23 and 28 are to be locked 90° out of phase with respect to the vertical frequency because the transducers 23 and 28 generate signals indicative of velocity rather than position and velocity and position are 90° out of phase whenever the difference between the constants, i.e., Y–X, is an odd number. Hence, a single shot multivibrator corresponding to single shot multivibrator 226 of FIG. 3 is included to provide a predetermined constant phase shift of 90° with respect to the vertical frequency.

When the phase shift difference is to be increased, phase discriminator 122 provides an output on conductor 123 and when the phase shift difference is to be decreased, it provides an output signal on conductor 124. Conductors 123 and 124 are connected to inputs of AND circuits 109 and 110 respectively and to inputs of OR circuit 107. OR circuit 107 has its output connected to single shot multivibrator 108 which provides a 300 microsecond pulse for conditioning AND circuits 109 and 110 thereby limiting the amount of correction at any one sample time.

The outputs of AND circuits 109 and 110 are at a down level when their inputs have been satisfied. The output of AND circuit 109 is used to condition AND circuit 113 for passing the normal frequency of 2.4 M Hertz from flip flop 103 to counter 117 via OR circuit 115 and AND circuit 116. Of course this occurs when the inputs to AND circuit 109 are not satisfied. Additionally the inputs to AND circuit 110 must not be satisfied in this instance so as to condition AND circuit 116.

If the inputs to AND circuit 109 are satisfied, then AND circuit 114 is conditioned to pass the frequency of 4.8 M Hertz from flip flop 102 to counter 117 via OR circuit 115 and AND circuit 116. AND circuit 116 will be conditioned because the inputs to AND circuit 110 are not satisfied. This is because discriminator 122 does not simultaneously provide signals on conductors 123 and 124. The inputs to AND circuit 110 are satisfied when the phase shift difference is to be decreased. Under this condition, the output of AND circuit 110 deconditions AND circuit 116 and counter 117 is not advanced for a period of 300 microseconds.

Figure 5:
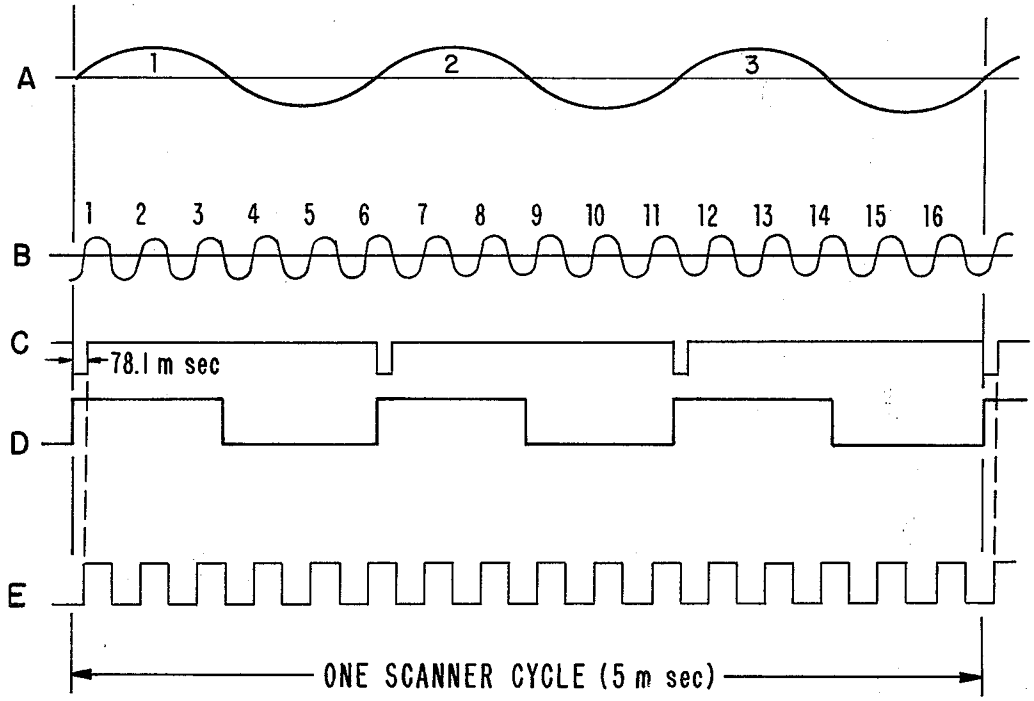
FIG. 5 is a waveform diagram illustrating the high and low frequency pulses for one scanner cycle.

The desired phase relationship for the signals generated by transducers 23 and 28 is represented by waveforms A and B respectively in FIG. 5. In other words, transducers 28 generate 5 ⅓ sine wave pulses for each sine wave pulse generated by transducers 23. The sine wave pulses represented by wave forms A and B are converted to square waves as represented by wave forms D and E respectively. The conversions are made by sine wave to the square wave converters 111 and 120 respectively. Thus, one scanner cycle in this example is equal to three low frequency pulses or 16 high frequency pulses which occur in 5 milliseconds. Waveform C shows the output of single shot multivibrator 136. Thus in every 30 second scanner cycle, phase discriminator 122 compares the delayed rising edge of every third 600 Hertz pulse to the rising edge of every sixteenth 3.2K hertz pulse.

Figure 4:
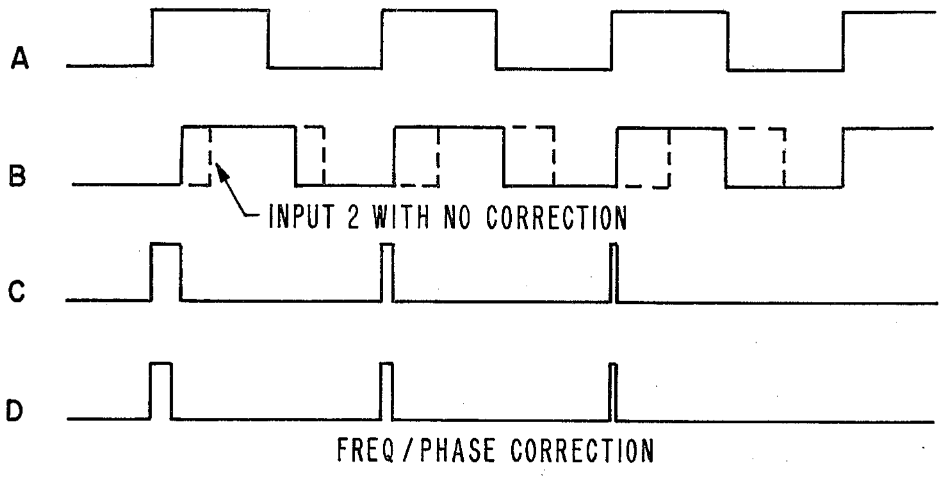
FIG. 4 is a waveform diagram including a series of waveforms to illustrate phase correction.

Input 1 to phase discriminator 122, FIG. 2, is shown as wave form A in FIG. 4 and input 2 is shown as waveform B. It is seen in FIG. 4, waveform A lags waveform B. Under these conditions, phase discriminator 122 provides an output signal represented by a waveform C, FIG. 4 on conductor 123, FIG. 2. This signal conditions AND circuit 109 whereby AND circuit 114 passes the 4.8 M Hertz signal from flip flop 102 to advance counter 117 at this rate for a period of time during which AND circuit 109 has an output. This period of time is represented by waveform D in FIG. 4. It is seen in FIG. 4 that this correction does not bring the inputs represented by waveforms A and B into phase. However, successive corrections bring waveforms A and B into phase as seen in FIG. 4.

Single shot multivibrator 108 in FIG. 2 limits the width of the corrections to the smaller of either 300 microseconds or the phase error between inputs 1 and 2 at phase discriminator 122. The correction size is limited to 300 microseconds and occurs once every thirty second scanner cycle. Therefore, assuming no error due to converters 111 and 120, the system could take as long as 85 seconds to achieve lock. The system lock accuracy is 0.5° with respect to torsional deflector 25 or about 0.14 percent.

The lock on time can be reduced significantly by applying the outputs of converters 111 and 120 directly to phase discriminator 122. With this arrangement, a correction window must be generated by dividing the output of converter 120 by 32 and apply the resultant signal to a single shot multivibrator, not shown, to generate a sample window of 312 microseconds. Thus the 3.2K Hertz pulse train need only be shifted over one period of the 600 hertz pulse train rather than over the period of common frequency of 6.25 Hertz. Also the correction window limits the correction pulse to a maximum of 312 microseconds thus eliminating the need for the 300 microseconds single shot 108.

Normally the scan pattern 30 in FIG. 1 is adequate for scanning the label 71 of FIG. 8. The turn around portions 33 of scan pattern 30, FIG. 1, effectively form two horizontal scans. This enhances the scanning of labels which are narrower than the one illustrated in FIG. 8.

Figure 7:
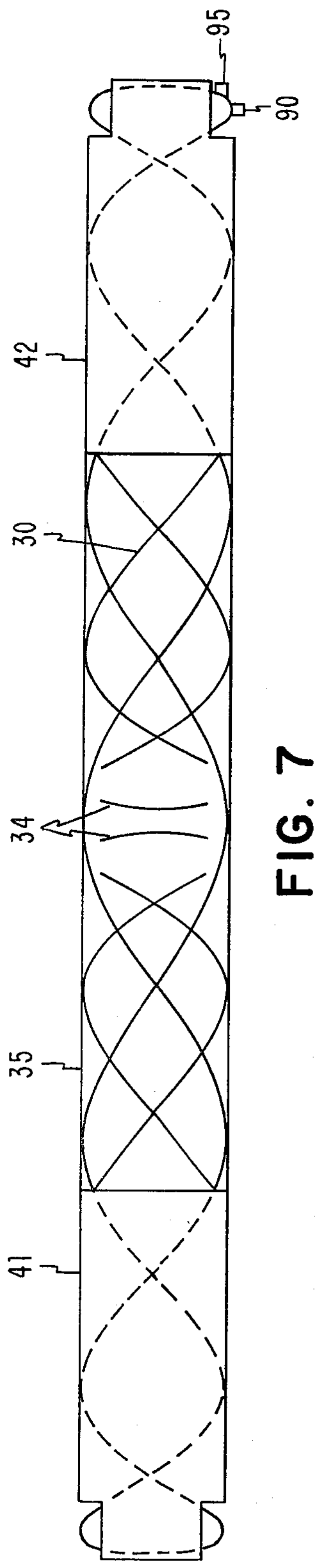
FIG. 7 is a developed plan view illustrating the scan pattern for the alternate embodiment shown in FIG. 6.
Figure 6:
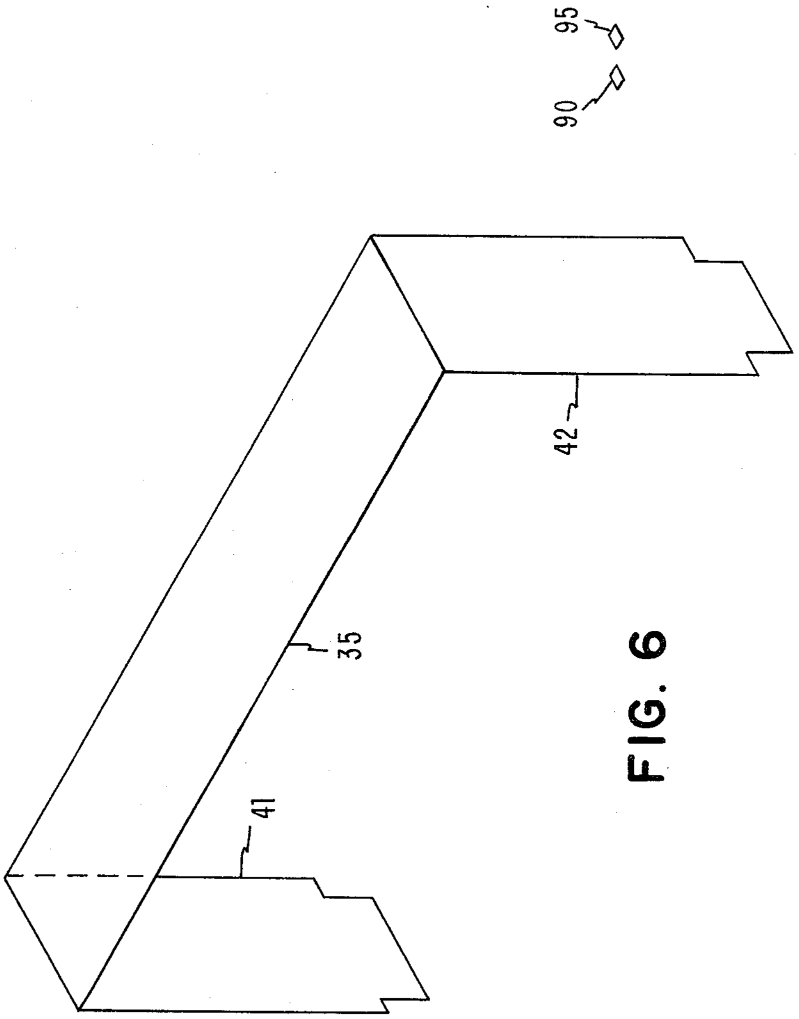
FIG. 6 is a partial perspective view illustrating an alternate embodiment of the invention.

In some instances it may be desirable to use the entire pattern for scanning modified labels. If the entire pattern is used, the slope of the pattern 30, FIG. 1, normally within the scan window is too shallow while the slope of the portions 31 and 32 is too steep. These variances are compensated by folding the portions 31 and 32 in toward the center of scan window 35. The folding is accomplished by side mirrors 41 and 42 as schematically represented in FIG. 6. Mirrors 41 and 42 are notched so that photodetectors 90 and 95 can amplitude sense the portion of the scan pattern outside the scan window, and not reflected by one of the mirrors and in this instance mirror 42. The resultant scan pattern 30 is illustrated in FIG. 7. The end portions of the scan appear as substantially vertical scan lines 34 near the center of the window. The scan pattern in FIG. 7 is generated with a vertical frequency seven times the horizontal frequency and the horizontal amplitude is seven times the vertical amplitude. This pattern is easy to generate and requires less detector band width than the pattern 30 of FIG. 1.

From the foregoing it is seen that applicants' invention provides an improved omnidirectional scanning system for scanning bar coded labels without regard to label orientation. It is seen that the two torsional deflectors are locked in phase and frequency so as to generate a pattern of interlaced X's with uniform spacing of the X's. Amplitude control is provided to maintain the light beam at a constant crossing angle and the scan window is configured so as to mask out the nonlinear end portions of the scan. It is also seen that the turn around portions of the scan pattern form horizontal scans so as to further reduce scan voids. In an alternate embodiment the end portions of the scan pattern not normally in the scan window are folded by mirrors into the scan window whereby two substantially vertical scans are available for scanning the labels.

We claim:

1. An omnidirectional scanning system for scanning bar coded labels on randomly oriented articles comprising a scan window;

a light source for providing a beam of light;

first light beam deflecting means positioned to receive said beam of light and deflect it in a first direction relative to said scan window;

second light beam deflecting means positioned to receive the beam of light deflected by said first light beam deflecting means and deflect it in a second direction relative to said scan window;

driving means for driving said first and second light beam deflecting means at first and second frequencies whereby the light beam traces within said scan window a series of interlaced X's;

control means for controlling said driving means so that said first and second light beam deflecting means are locked in frequency and phase; and amplitude control means for sensing the amplitudes of said first and second beam deflections to generate first and second amplitude control signals and circuit means for applying said first and second amplitude control signals to said driving means.

2. The omnidirectional scanning system of claim 1 wherein said light source is a laser.

3. The omnidirectional scanning system of claim 1 wherein said first and second light beam deflecting means are torsional deflectors.

4. The omnidirectional scanning system of claim 1 wherein said control means are digital.

5. An omnidirectional scanning system for scanning coded labels on randomly oriented articles transported along a path through a scanning station comprising a scan window positioned in the plane of said transport path;

light source means for providing a beam of light having a predetermined width;

first light beam deflector means oscillating at a first predetermined frequency and positioned to deflect said light beam away from said light source and in a first direction relative to said scan window;

second light beam deflector means oscillating at a second predetermined frequency and positioned to deflect the light beam deflected by said first deflector means in a second direction relative to said scan window whereby said deflected light beam moves along a path inside and outside of said scan window so that path in said scan window appears as a series of interlaced X's;

first oscillating means for oscillating said first beam deflector means at said first predetermined frequency;

second oscillating means for oscillating said second beam deflector means at said second predetermined means for locking said first and second oscillating means in phase and frequency.

6. The omnidirectional scanning system of claim 5 wherein said means for locking said first and second oscillating means in phase and frequency comprises oscillator means for providing signals at third and fourth frequencies, said third frequency being greater than said first and second predetermined frequencies and said fourth frequency being less than said first and second frequencies;

first signal generating means for generating a signal proportional to the frequency of said first light beam deflector means second signal generating means for generating a signal proportional to the frequency of said second light beam deflector means;

phase detecting means connected to receive the signals from said first and second signal generating means and responsive to generate increase and decrease control signals when said signals from said first and second generating means are out of phase in first and second directions respectively; and logic means connected to receive signals at said second, third and fourth frequencies and connected to operate said second oscillating means at said second frequency in the absence of said increase and decrease control signals and to operate said second oscillating means at said third and fourth frequencies in response to increase and decrease control signals respectively.

7. The omnidirectional scanning system of claim 6 wherein said logic means includes means for limiting the amount of time said increase and decrease control signals are present to operate said second oscillating means at said third and fourth frequencies.

8. An omnidirectional scanning system for scanning bar coded labels on randomly oriented articles comprising a scan window, a light source for providing a beam of light, first light beam deflecting means positioned to receive said beam of light and deflect it in a first direction relative to said scan window, second light beam deflecting means positioned to receive the beam of light deflected by said first light beam deflecting means and deflect it in a second direction relative to said scan window, first driving means for oscillating said first light beam deflecting means over a predetermined deflection amplitude at a predetermined frequency, second driving means for oscillating said second beam deflecting means over a predetermined deflection amplitude at a ratio frequency of said predetermined frequency, sensing means for sensing the phase relationship between said first and second light beam deflecting means to develop an error signal proportional to the degree said first and second light beam deflecting means are out of a predetermined phase relationship, and means for applying said error signal to said second driving means to bring said first and second beam deflecting means into said predetermined phase.

* * * * *

UNITED STATES PATENT OFFICE

CERTIFICATE OF CORRECTION

PATENT NO. : 3,919,527

DATED : November 11, 1975

INVENTOR(S) : A. J. Bowen, L. D. Dickson, J. A. Goretzki, K. E. Hendrickson, D. P. King, T. W. Kueper, R. L. Soderstrom It is certified that error appears in the above-identified patent and that said Letters Patent are hereby corrected as shown below:

Column 10, line 6, after "predetermined" insert --frequency; and--

Signed and Sealed this

*second* Day of *March 1976*

[SEAL]

*Attest:*

RUTH C. MASON
*Attesting Officer*

C. MARSHALL DANN
*Commissioner of Patents and Trademarks*